(12) United States Patent
D'Aleo et al.

(10) Patent No.: US 6,372,372 B1
(45) Date of Patent: Apr. 16, 2002

(54) CLAMPING SYSTEM FOR A FUEL CELL STACK

(75) Inventors: James M. D'Aleo; Charles M. Carlstrom, Jr., both of Clifton Park; Russel H. Marvin, Voorheesville, all of NY (US); Michael M. Walsh, Fairfield, CT (US); Norman Peschke, Clifton Park; Gary D. Antonelli, Niskayuna, both of NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/502,886

(22) Filed: Feb. 11, 2000

(51) Int. Cl.$^7$ .............................. H01M 2/00; H01M 8/02
(52) U.S. Cl. .............................. 429/34; 429/12; 429/35; 429/37; 429/38; 429/39
(58) Field of Search .............................. 429/12, 34, 14, 429/17, 35, 38, 37, 39

(56) References Cited

U.S. PATENT DOCUMENTS

| | | |
|---|---|---|
| 4,689,280 A | 8/1987 | Gionfriddo |
| 4,719,157 A | 1/1988 | Tsutsumi et al. |
| 4,758,481 A * | 7/1988 | Fauvel ........................ 429/39 |
| 4,973,531 A | 11/1990 | Zaima et al. |
| 4,997,728 A | 3/1991 | Onoda et al. |
| 5,009,968 A | 4/1991 | Guthrie et al. |
| 5,419,980 A | 5/1995 | Okamoto et al. |
| 5,441,825 A | 8/1995 | Barlow |
| 5,484,666 A | 1/1996 | Gibb et al. |
| 5,534,362 A | 7/1996 | Okamoto et al. |
| 5,547,777 A | 8/1996 | Richards |
| 5,607,786 A | 3/1997 | Guthrie et al. |
| 5,736,269 A | 4/1998 | Okamoto et al. |
| 5,789,091 A | 8/1998 | Wozniczka et al. |

FOREIGN PATENT DOCUMENTS

| | | |
|---|---|---|
| DE | 1 358 243 | 7/1974 |
| EP | 63108678 | 5/1988 |
| JP | 58-53166 | 3/1983 |
| WO | WO 99/27602 | 6/1999 |

\* cited by examiner

*Primary Examiner*—Stephen Kalafut
*Assistant Examiner*—Angela J. Martin
(74) *Attorney, Agent, or Firm*—Trop, Pruner & Hu, P.C.

(57) ABSTRACT

A fuel cell stack assembly includes a stack of fuel cell flow plates that include fluid passageways; pipes to communicate fluids with the fluid passageways; an end plate; and a dielectric manifold. The end plate supports a compressive load to compress the stack, and the end plate includes openings. The manifold is located between the end plate and the stack to communicate the fluids between the pipes and the fluid passageways. The manifold at least partially extends through the openings in the end plate to form a sealed connection between the manifold and the pipes.

17 Claims, 9 Drawing Sheets

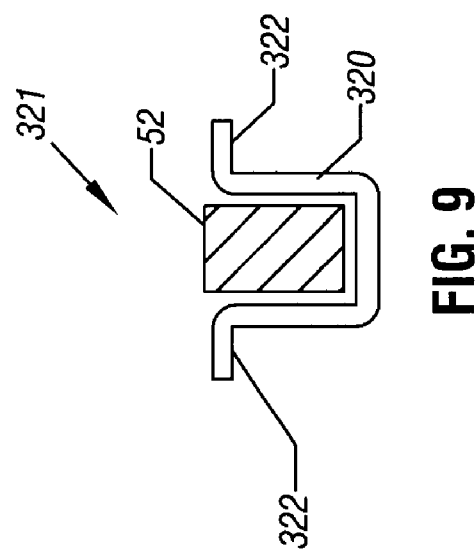
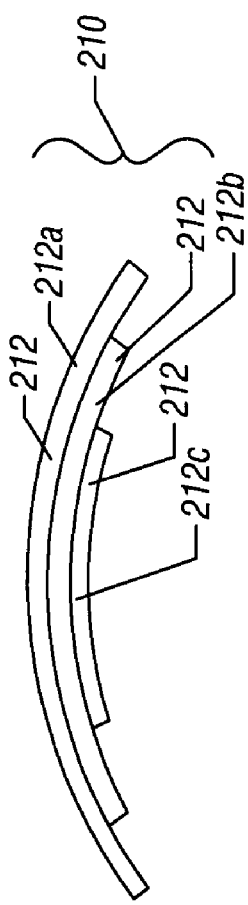
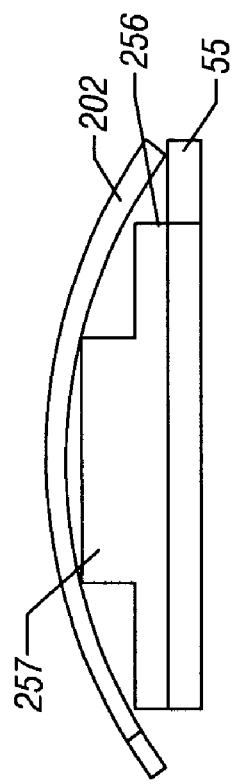
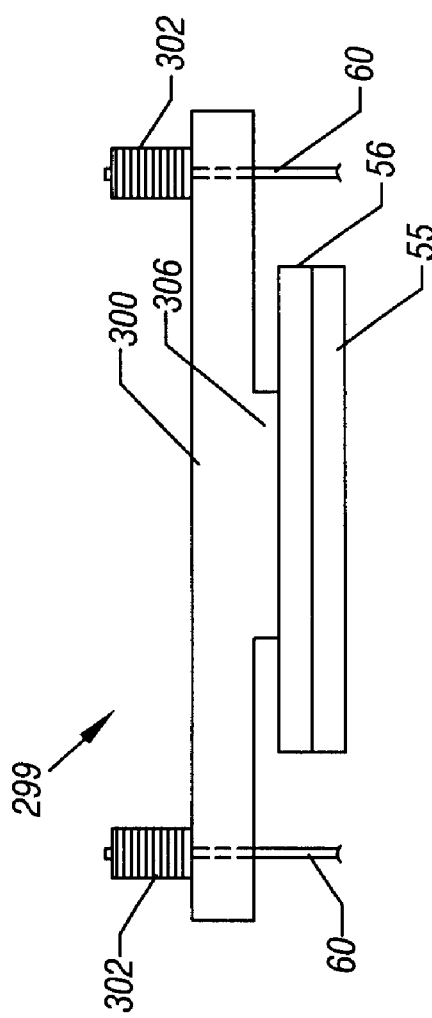

CLAMPING SYSTEM FOR A FUEL CELL STACK

BACKGROUND

The invention relates to a clamping system for a fuel cell stack.

A fuel cell is an electrochemical device that converts chemical energy that is produced by a reaction directly into electrical energy. For example, one type of fuel cell includes a proton exchange membrane (PEM), often called a polymer electrolyte membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

$$H_2 \rightarrow 2H^+ + 2e^-$$

at the anode of the cell, and $$O_2 + 4H^+ + 4e^- \rightarrow 2H_2O$$

at the cathode of the cell.

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide a larger amount of power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells.

For purposes of directing the reactant, coolant and product flows into and out of the flow channels of the flow plates, the flow plates typically include aligned openings to form manifold passageways in the stack. Gaskets may be located between the flow plates to seal off these manifold passageways and seal off the flow channels that are formed by the flow plates.

FIG. 1 depicts an exemplary fuel cell stack assembly 10, an assembly that includes a stack 12 of flow plates that are clamped together under a compressive force. To accomplish this, the assembly 10 typically includes end plate 16 and spring plate 20 that are located on opposite ends of the stack 12 to compress the flow plates that are located between the plates. Besides the end plate 16 and spring plate 20, the assembly 10 may include a mechanism to ensure that a compressive force is maintained on the stack 12 over time, as components within the stack 12 may settle, or flatten, over time and otherwise relieve any applied compressive force.

As an example of this compressive mechanism, the assembly 10 may include another end plate 14 that is secured to the end plate 16 through tie rods 18 that extend through corresponding holes of the spring plate 20. The spring plate 20 is located between the end plate 14 and the stack 12, and coiled compression springs 22 may reside between the end plate 14 and spring plate 20. The tie rods 18 slide through openings in the spring plate 20 and are secured at their ends to the end plates 14 and 16 through nuts 15 and 17. Due to this arrangement, the springs 22 remain compressed to exert a compressive force on the stack 12 over time even if the components of the stack 12 compress.

To establish connections for external conduits (hoses and/or pipes) to communicate the reactants, coolants and product with the manifold passageways of the stack 12, the assembly 10 may include short connector conduits, or pipes 24, that may be integrally formed with the end plate 16 to form a one piece end plate assembly (for example, pipes 24 may be welded to end plate 16). The pipes 24 form the complex part of the end plate assembly, making the end plate assembly difficult to mass manufacture due to the high cost of the required materials and the multiple operations that may be needed to manufacture the end plate assembly.

Thus, there is a continuing need for an arrangement that addresses one or more of the problems that are stated above, or that improves such functionality and features.

SUMMARY

In an embodiment of the invention, a fuel cell stack assembly includes a stack of fuel cell flow plates that include fluid passageways; pipes to communicate fluids with the fluid passageways; an end plate; and a dielectric manifold. The end plate supports a compressive load to compress the stack, and the end plate includes openings. The manifold is located between the end plate and the stack to communicate the fluids between the pipes and the fluid passageways. The manifold at least partially extends through the openings in the end plate to form a sealed connection between the manifold and the pipes.

In another embodiment of the invention, a fuel cell stack assembly includes first and second end plates; a fuel cell stack of flow plates; at least one spring; and tie rods. The stack is located between the first and second end plates, and the spring(s) have ends that extend across different edges of the first end plate. Each tie rod has a first end that is connected to one of the ends of said at least one spring and a second end that is connected to the second end plate to cause the first and second end plates to apply a compressive force to the stack.

Advantages and other features of the invention will become apparent from the following description, from the drawing and from the claims.

BRIEF DESCRIPTION OF THE DRAWING

FIGS. 6, 7 and 8 are schematic diagrams of compression mechanisms according to different embodiments of the invention.

FIGS. 9 and 10 are schematic diagrams of a fuel cell stack assembly according to different embodiments of the invention.

DETAILED DESCRIPTION

Figure 1:
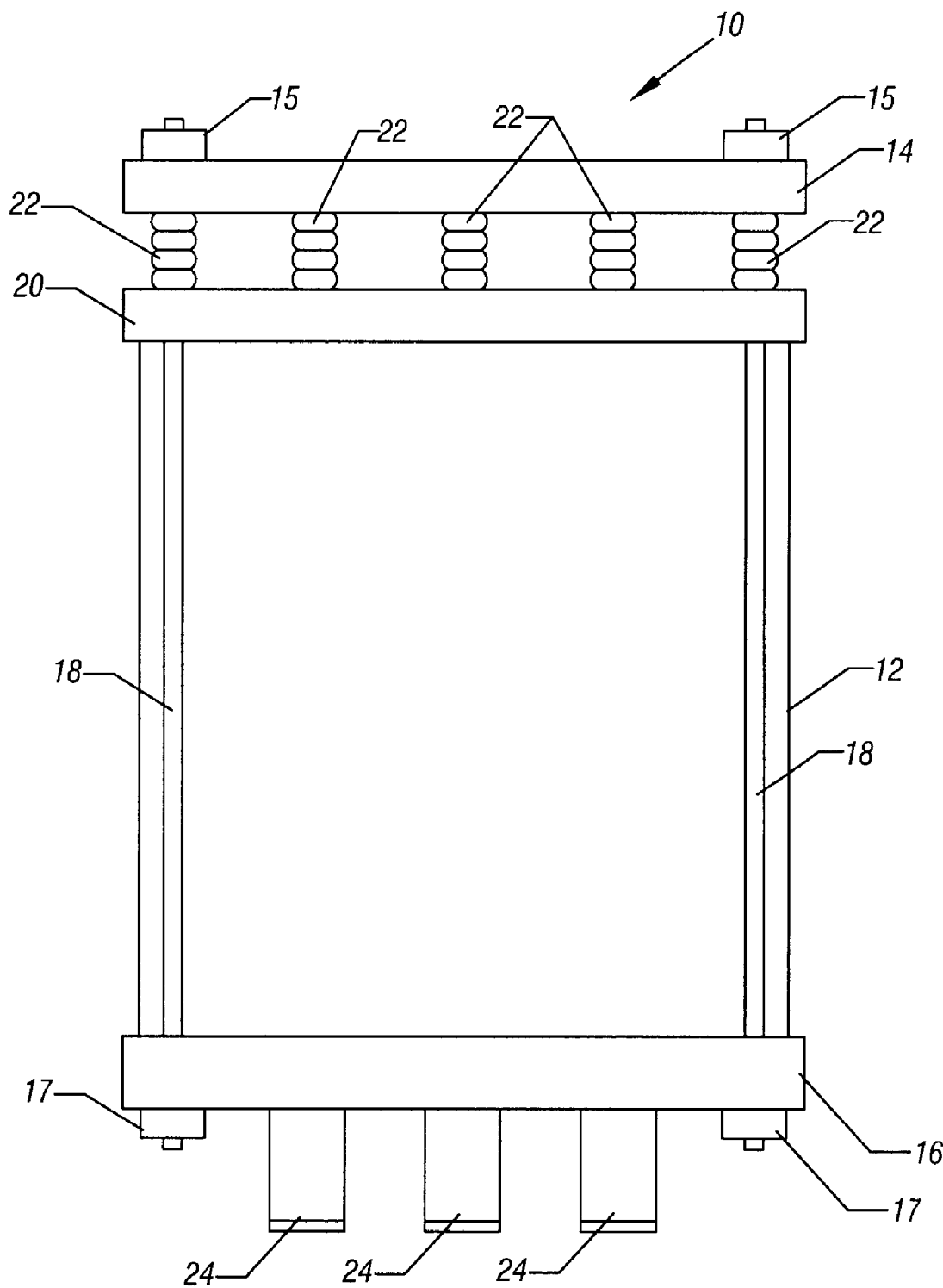
FIG. 1 is a schematic view of a fuel cell stack assembly of the prior art.
Figure 2:
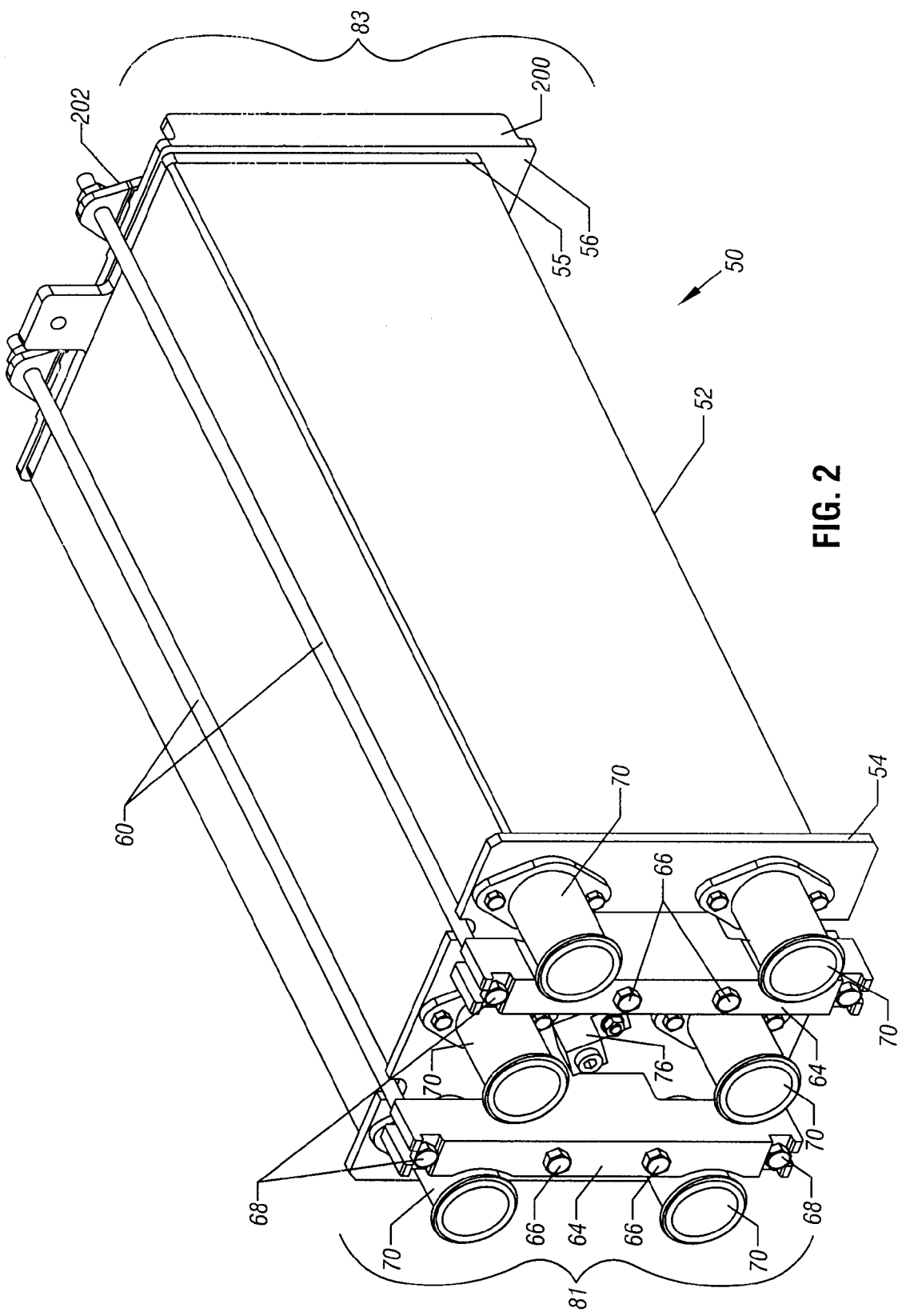
FIGS. 2 and 5 are perspective views of a fuel cell stack assembly according to an embodiment of the invention.

Referring to FIG. 2, an embodiment 50 of a fuel cell stack assembly in accordance with the invention includes a fuel cell stack 52 that includes fuel cells that produce electrical power. At a service end 81 of the stack 52, the assembly 50 includes short conduits, or port pipes 70, that form an interface of the assembly 50 for connecting pipes or hoses (not shown) to the stack 52 for purposes of communicating fluids with the stack 52. In this manner, the pipes/hoses communicate reactants to sustain electrochemical reactions inside the stack 52; communicate reactants from the stack 52 that are not consumed by the electrochemical reactions; and communicate a coolant through the stack 52. The pipes 70 are connected to a structural end plate 54 (of the assembly 50) that is located at the service end 81 of the assembly 50. The end plate 54 functions in combination with another structural end plate 56 (that is located at the opposite end 83 of the stack 52) to compress the stack 52 (that resides between the two end plates 54 and 56) together.

Unlike conventional arrangements, the pipes 70 are not integrally formed with the end plate 54. Instead, the pipes 70 and the end plate 54 may be separate members that may be manufactured separately. Thus, due to this arrangement, the end plate 54, being the more structurally significant member, may be made using one type of manufacturing process and material, and the more non-structurally significant pipes 70 may be made by another manufacturing process. This separation in manufacturing processes may, in turn, substantially reduce the overall cost and assembly time that is associated with manufacturing the stack assembly 50. In some embodiments, the pipes 70 may be replaced by hose fittings that allow hoses to be directly plugged into the endplate 54 at manifold 100. Unlike the embodiment shown in FIG. 2 where pipes 70 are bolted to end plate 54, in such embodiments, reactant lines could be plugged directly into the assembly 50.

Figure 3:
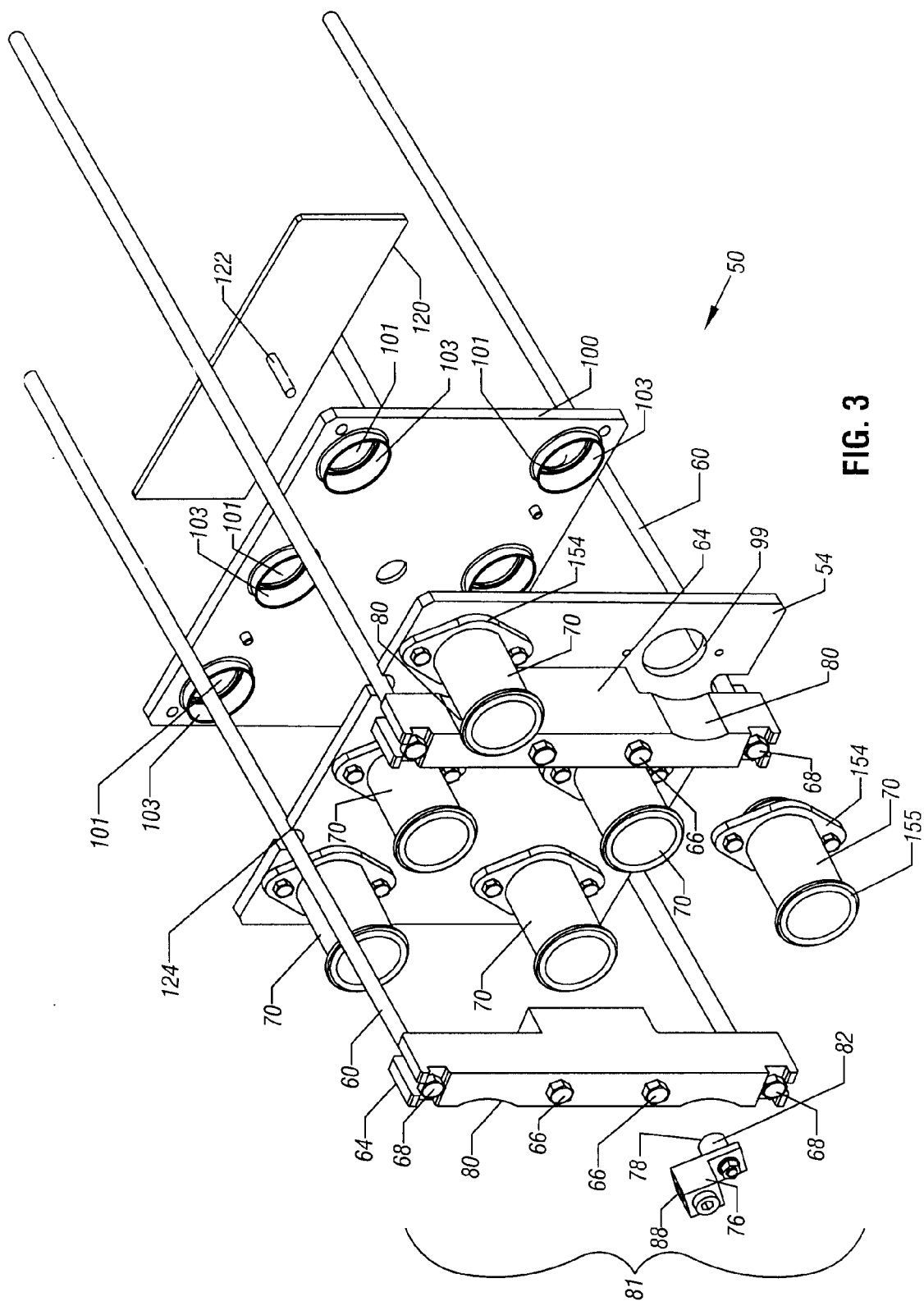
FIGS. 3 and 4 are opposing exploded perspective views of a service end of the fuel cell stack assembly of FIGS. 2 and 5 according to an embodiment of the invention.

Referring also to FIG. 3, more particularly, in some embodiments of the invention, the pipes 70 are not sealed to the end plate 54, but instead, the pipes 70 are sealed to a manifold 100 that is located on the other side of the end plate 54 and extends through openings 99 in the end plate 54 to form the seal (as described below). Unlike the end plate 54, the manifold 100 may be formed from structurally weaker material (a plastic, for example) and may be an electrically nonconductive, or dielectric, material. Thus, due to this arrangement, and because the end plate 54 will not be in contact with the reactants, the end plate 54 may be made out of a conductive flat sheet of steel (e.g., about ⅜ in. thick), for example; the pipes 70 may be separately cast out of metal; and manifold 100 may be a plastic that is formed from injection molding, for example. As examples, the end plate can be made from cold or hot rolled steel, or hot pressed or stamped steel. As an example, the manifold 100 may be a 5/16 in. polycarbonate plate. These separate manufacturing techniques, in turn, may reduce the overall cost that is associated with manufacturing the assembly 50.

The seal between the pipes 70 and the manifold 100 prevents wetting of the steel that may be used to form the end plate 54. Thus, it is no longer required that stainless steel be used, or that end plate 54 have a protective coating. Furthermore, the manifold 100 forms an electrically nonconductive layer to electrically isolate the conductive end plate 54 from a current collector plate 120 that, as its name implies, conducts current from one of the stack 52.

Figure 4:
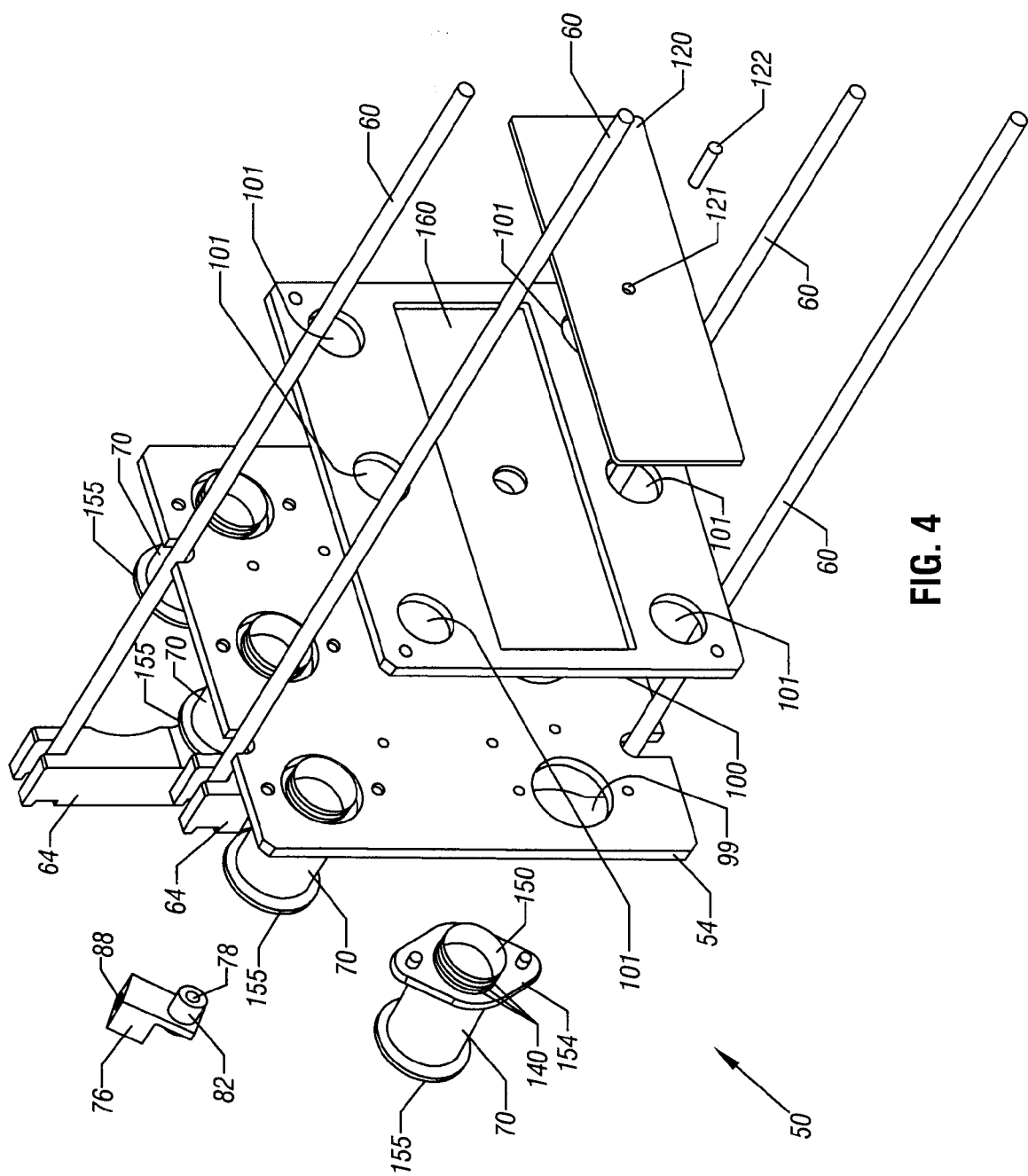

Referring also to FIG. 4, in some embodiments of the invention, each pipe 70 may be made out of steel and include flanges 154 and 155 at the opposite ends of the pipe 70. The flange 154 mates with the adjacent flat surface of the end plate 54 to secure the pipe 70 to the end plate 54. The other flange 155 may be used to establish a connection with another hose or pipe (not shown) for purposes of communicating fluid with the stack 52. The flange 154 includes holes for receiving bolts that extend into holes of the end plate 54 to secure the pipe 70 to the end plate 54 and position the pipe 70 so that the central passageway of the pipe 70 is aligned with an opening 99 (see also FIG. 3) of the end plate 54. In this manner, when secured to the end plate 54, a tubular extension 150 (see FIG. 4) of the pipe 70 extends into the opening 99, and an annular manifold insert 103 (see FIG. 3) of the manifold 100 protrudes into the opening 99 and circumscribes the tubular extension 150. O-ring seals 140 (see FIG. 4) may be used to form a seal between the exterior of the extension 150 and the interior of the annular manifold insert 103 and create a friction fit between these members. In some embodiments, two O-ring seals 140 may be used on each extension 150. In other embodiments, only one O-ring seal 140 is used on each extension 150. The O-rings 140 may be made of a material selected to accommodate the fluids being sealed. For example, the O-rings 140 may be made of a flourosilicone material.

In some embodiments of the invention, the manifold 100 is formed from a relatively flat piece of material and includes openings 101 that are aligned with the openings 99; the central passageways of the pipes 70; and corresponding manifold passageway openings of the stack 52. Each annular insert 103 circumscribes one of the openings 101 and extends orthogonally away from the flat portion of the manifold to extend into one of the openings 99. Thus, when the manifold 100 is positioned against the end plate 54, the flat portion of the manifold 100 resides against the adjacent flat surface of the end plate 54, and the annular inserts 103 extend into the openings 99 to mate with the tubular extensions 150 of the pipes 70.

The collector plate 120 establishes electrical contact with the flow plate that is closest to the service end 81 of the stack assembly 50, and in some embodiments of the invention, the collector plate 120 resides in a rectangular depression 160 of the manifold 100. In this manner, the depression is formed in a surface (of the manifold 100) that is adjacent to the collector plate 120 so that the collector plate 120 is flush with the surface of the manifold 100 for purposes of ensuring a sufficient seal between the manifold 100 and the stack 52. The collector plate may be a copper material, or a copper material plated with Gold or Tin.

Referring back to FIG. 3, for purposes of establishing electrical connections between the stack assembly 50 and circuitry that is external to the assembly 50, the assembly 50 may include a conductive (metallic, for example) connector 76. The connector 76 is secured to the conductive rod 122 that extends through a dielectric spacer 82 that isolates the electrically conductive connector 76 from the electrically conductive end plate 54. The connector 76 includes an opening 78 to receive the conductive rod 122 (see also FIG. 4) that is mounted in a hole 121 of the collector plate 120 and extends through openings in the end plate 99 and the manifold 100 to the connector 76. The connector 76 also includes an opening 88 to receive a conductive cable that is electrically connected to the external circuitry. In some embodiments, the rod 122 can be a threaded member that receives a threaded wire attachment (not shown) in place of connector 76, or connector 76 can itself be threaded.

To hold the stack 52 in compression, the stack assembly 50 may include load bars 64 (two load bars, for example)

that are positioned between the pipes 70 and are secured to the outer surface of the end plate 54. As an example, each load bar 64 may include curved surfaces 80, each of which extends around one of the pipes 70. Each load bar 64 may be made of cold drawn steel (as an example) and may be bolted (via bolts 66) to the end plate 54, and each load bar 64 may include openings on each end of the load bar 64 to receive one end of a tie rod 60 (a strain-hardened ½ in. O.D. 316 stainless steel threaded tie rod, for example).

Figure 5:
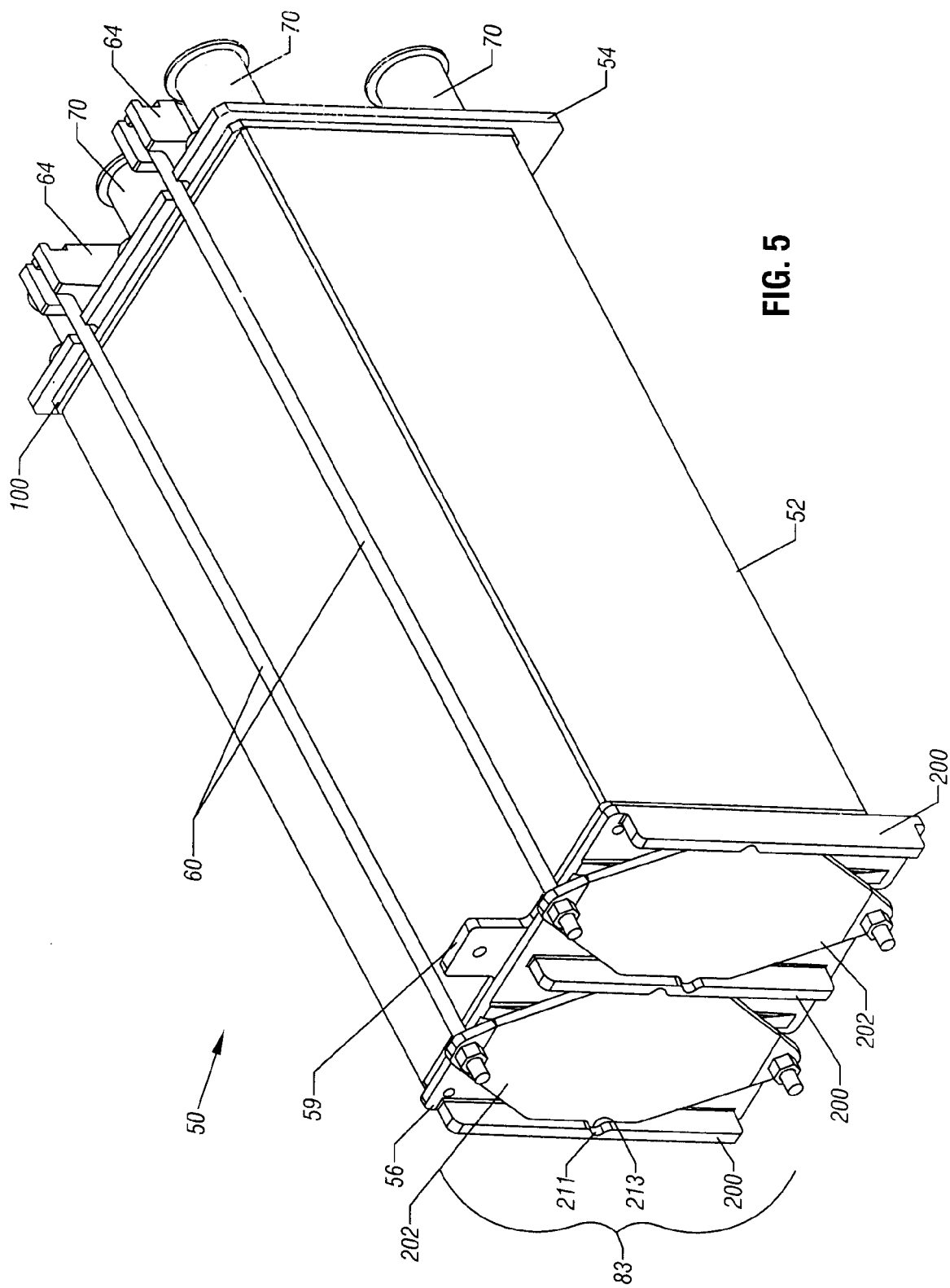

In this manner, each tie rod 60 extends from the load bar 64 along the outside of the stack 52 and is connected at its other end to a leaf spring 202 that rests on the outer surface of the end plate 56, as depicted in FIG. 5. As an example, leaf springs 202 may be made from 4140 steel, heat treated to RC 47-42, having a thickness of 0.313 in. and a cross-sectional distance between tie rod edges of 10.875 in. It will be appreciated that the size of the leaf springs 202, as well as other springs which may be used under the invention, may vary according to the size of the stack 52. For example, it may be desired to apply approximately 200 psi of compressive force onto the active area of the stack 52. Referring also to FIG. 5, as shown, each leaf spring 202 extends across the end plate 56 so that opposite ends of the leaf spring 202 protrude beyond different edges of the end plate 56. As a more specific example, the stack assembly 50 may include four tie rods 60 and two leaf springs 202. For this example, two tie rods 60 are connected to one of the leaf springs 202, and the other two tie rods 60 are connected to the other leaf spring 202. Each leaf spring 202, in turn, is partially deflected by its two associated tie rods 60 that are anchored to the load bars 64, a deflection that causes the leaf spring 202 to exert tension forces on the two associated tie rods 60 to compress the stack 52. As an example, the leaf spring 202 may be made from heat treated alloy steel.

As depicted in FIG. 5, in some embodiments of the invention, the end plate 54 includes three parallel lands 200 that form two channels in between the lands 200 to receive the leaf springs 202. The lands 200 ensure that the leaf springs 202 remain precisely located to concentrate the compression on the stack 52 to the active areas of the stack 52. Furthermore, for the same purpose, each land 200 may include a guide notch 211 for receiving a complementary ridge 213 of one of the leaf springs 202.

As an example, the end plate 56 may be formed out of a dielectric material, such as a glass-epoxy laminate (e.g., Micarta Materials of Westinghouse Corporation). Such material may be machined, or fiber filled plastic materials may be injection or compression molded. The dielectric nature of the end plate 56 keeps the conductive leaf springs 202 from establishing an electrical connection with a current collector plate 55 that is located between the end plate 56 and the stack 52. The current collector plate 55 may include an outwardly extending connection tab 59 for purposes of connecting the current collector plate 55 to external circuitry.

In some embodiments of the invention, the end plate 56 may have a profile as represented by end plate 256 in FIG. 6. The end plate 256 includes a raised ridge 257 on which the leaf springs 202 rest. As an example, the raised ridge 257 may have a height of about 0.4 in. to allow deflection of leaf spring 202. In this manner, the ridge 257 may be generally curved to approximate the curvature of the leaf spring 202 when the leaf spring 202 is deflected to provide support for the spring 202.

Referring to FIG. 7, in other embodiments of the invention, the leaf spring 202 may be replaced by a leaf spring assembly 210. In this manner, the leaf spring assembly 210 includes multiple stacked leaf springs 212 (leaf springs 212a, 212b and 212c, as examples) that have different lengths and are centered with respect to each other so that the longer leaf springs 212 overlap the shorter leaf springs 212. As an example, as depicted in FIG. 7, the leaf spring 212c may be located at the bottom of the assembly 210 between the end plate 56 and the leaf spring 212b. The leaf spring 212a (the longest of the leaf springs 212a, 212b and 212c) may be located on top of the leaf spring 212b and its ends may be connected to the tie rods 60. Such an arrangement may increase the amount of spring deflection available in such an assembly.

Referring to FIG. 8, in another embodiment of the invention, the leaf spring 202 or leaf spring assembly 210 may be replaced by a T-shaped load bar 299 that may be formed, for example, from tempered metal and include a first portion 300 that extends in a cantilevered manner over the stack 52 and a shorter portion 306 that serves as a base and resides between the portion 300 and the end plate 56. In this manner, coil springs 302 may be located on the ends of the portion 300 to connect the tie rods 60 to the load bar 299.

Referring to FIG. 9, in some embodiments of the invention, in a stack assembly 321, the end plate 54 and the tie rods 60 may be replaced by stamped steel or aluminum bracket 320 that has openings to permit fluid communication with the manifold passageways of the stack 52. As shown the bracket 320 may be generally U-shaped to cradle one end of the stack 52 and may includes flanges 322 that may be secured to springs, for example, that contact the outer surface of the end plate 56.

Figure 10:
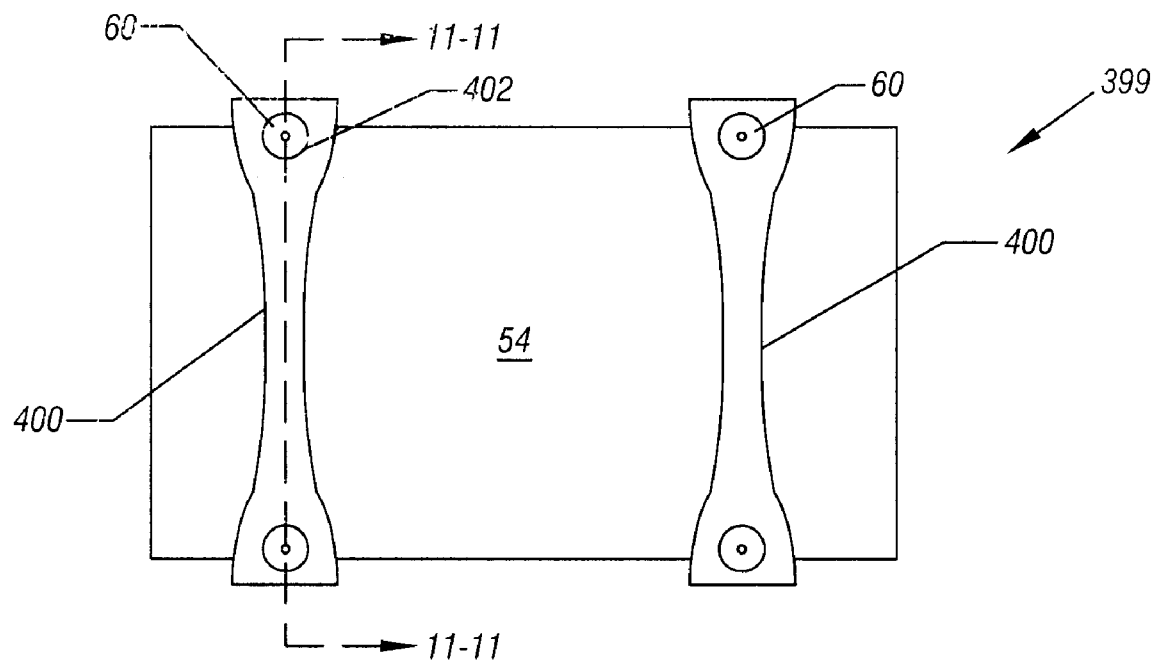
Figure 11:
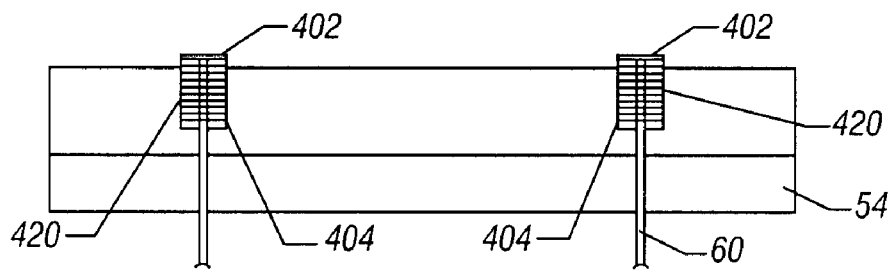
FIG. 11 is a cross-sectional view taken along line 11—11 of FIG. 10.

Referring to FIGS. 10 and 11, in some embodiments of the invention, a stack assembly 399 may include load bars 400, each of which includes a recess 404 to hold a coiled compression spring 420. In this manner, each spring 420 resides in the recess 404 of the load bar 400. A tie rod 60 extends through the open center of each spring 420 and includes an end cap 402 to push the spring 420 into the recess 404 to compress the spring 420 and compress the stack 52. As an example, springs 420 may be an "Extra Heavy Duty Die Spring", 2 in. O.D., 3 in. length, available from Associated Spring Raymond. In general, such springs may be used for any of the compression spring applications under the present invention.

Figure 12:
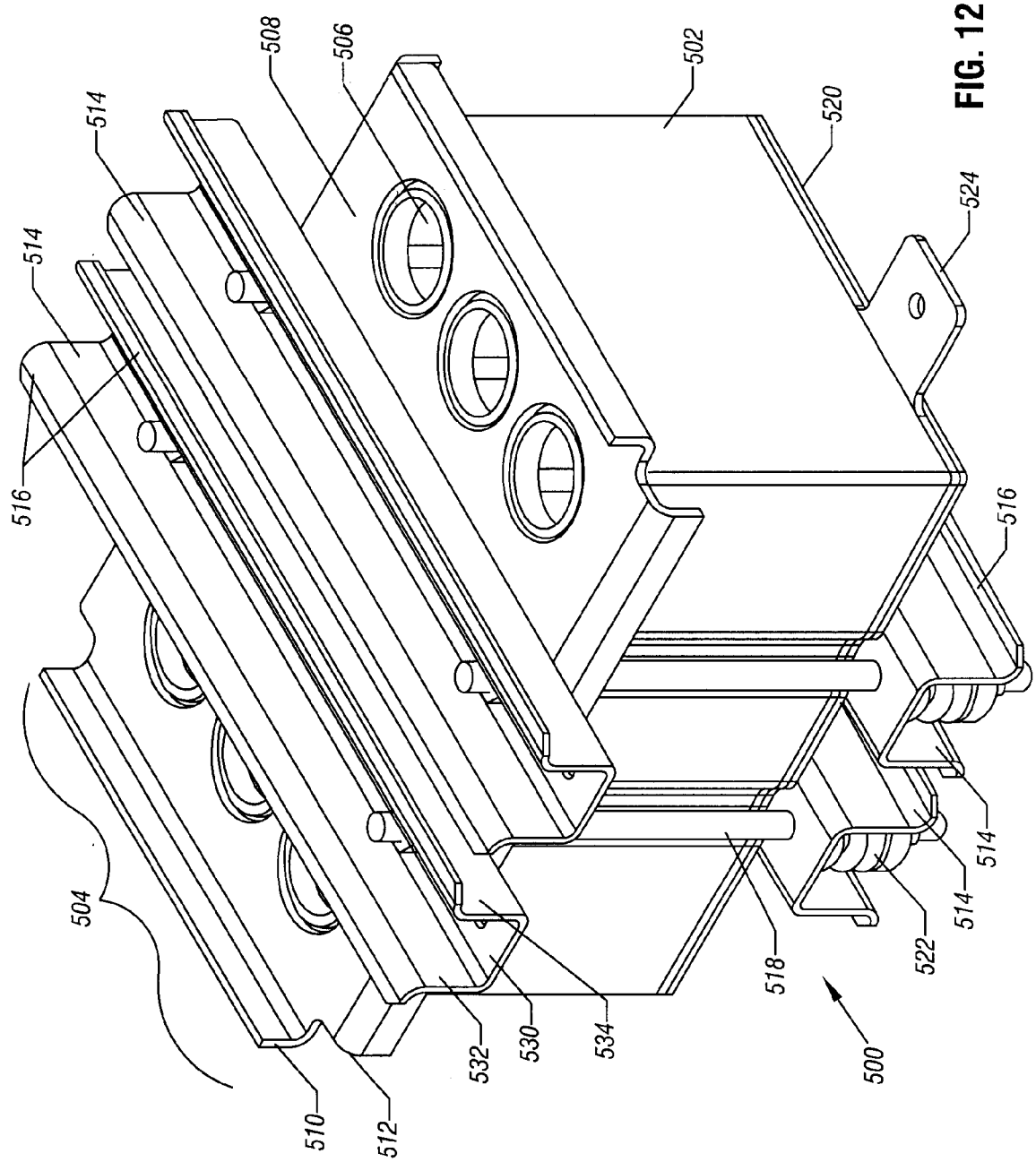
FIGS. 12 and 13 are perspective views of a fuel cell stack assembly according to an embodiment of the invention.
Figure 13:
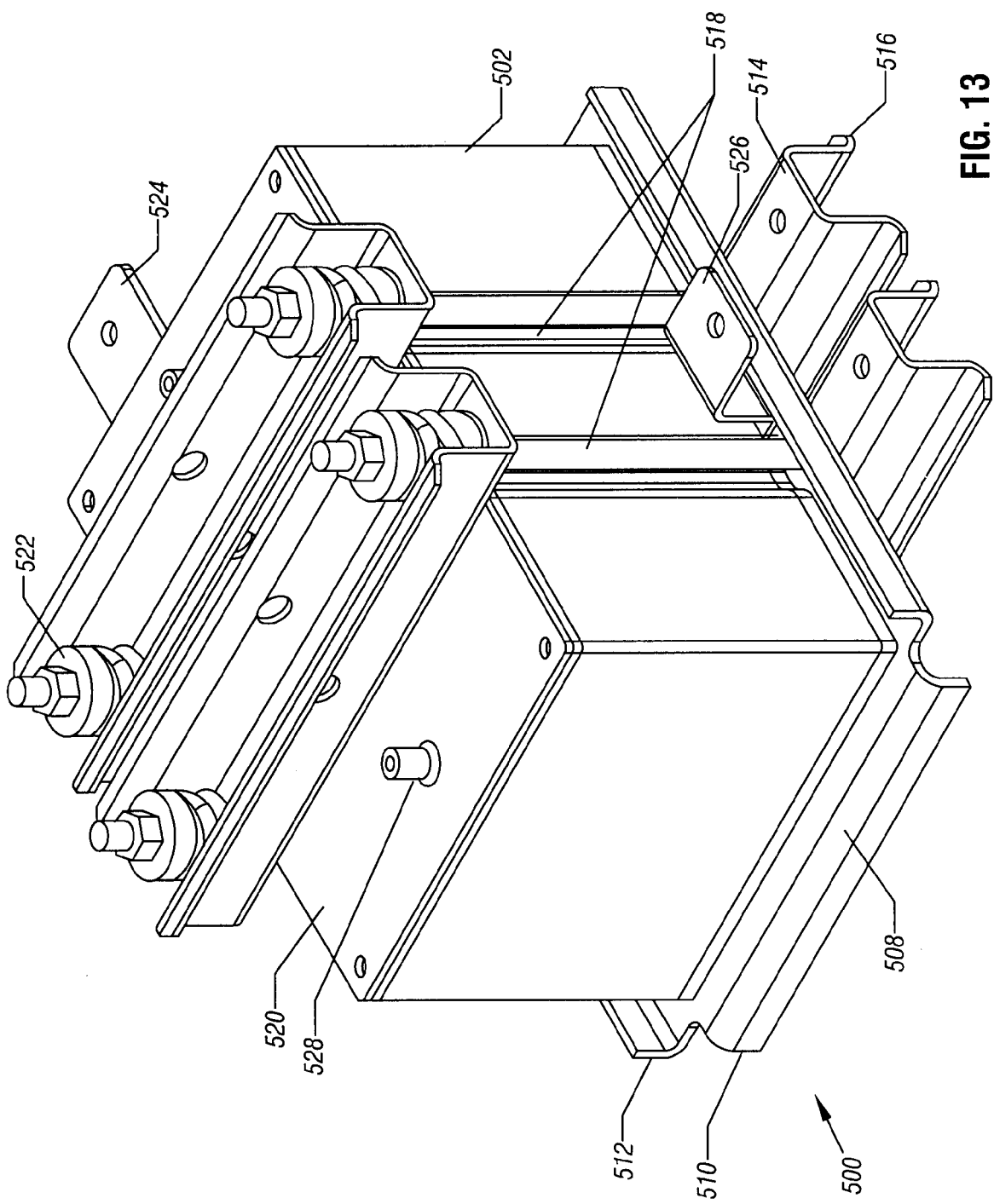

Referring to FIGS. 12 and 13, an embodiment 500 of a fuel cell stack assembly in accordance with the invention includes a fuel cell stack 502. Current collectors 524 and 526 are shown. At a service end of the stack 504, the assembly 500 includes manifolds openings 506 similar to those described with respect to FIG. 4. Thus, in some embodiments the end plate 508 may be mated with a manifold layer (not shown), similar to that shown in FIG. 3 (100), to allow reactant and coolant conduits (not shown) to be connected to the assembly 500.

The end plate 508 has a first set of opposing edges 510 turned in one orthogonal direction form the end plate 508, and a second set of opposing edges 512 turned in another orthogonal direction from the end plate 508. The turned edges 510, 512 of end plate 508 increase the structural integrity of the plate 508 (e.g., they support against warping of the plate 508), allowing it to be made from a thinner material (e.g., 7 stamped steel), while serving the same structural requirements of a thicker plate (e.g., cold rolled steel) without turned edges. The edges can be turned in the same or different directions with respect to each other (e.g., they can be all turned in the same direction). The length of the turned portion of an edge may be pre-selected (e.g., 1 in.). While it is preferred that edges 510, 512 are turned to an orthogonal angle with respect to the plane of the plate 508, other angles are possible.

In the embodiment shown in FIGS. 12 and 13, the non-service end plate 520 is a flat plate. However, in other embodiments, an end plate 508 with turned edges may be used on both sides of the stack.502. End plate 520 is shown with optional air bleed ports 528. Air bleed ports 528 are positioned to extend through the end plate 528 and manifold layer into the coolant manifold inside the stack 502 to allow any air accumulating in the system coolant to be removed from this point, either as the system is initially filled with coolant, or during operation. As examples, port 528 may be fitted with a threaded screw for sealing, or may be fitted with a drainage or a coolant recirculation tube.

To hold the stack under compression, load members 514 are positioned between the openings 506, and are secured to the outer surface of end plate 508. In the embodiment shown in FIGS. 12 and 13, each load member 514 is a generally u-shaped channel member with generally orthogonal support lips 516. The channel member 514 may have a central portion 530 abutting end plate 508. The walls of channel member 532 and 534 may be perpendicular to central portion 530, or may be at some other angle (e.g., 45°). Similarly, support lips 516 may be in a plane parallel to central portion 530, or may be at some other angle (e.g., within about 10 degrees of the plane of central portion 530). The invention is not limited by the specific angles selected for these features. This configuration allows load members 514 to be made from a thin material (e.g., 7 gauge stamped steel), while serving the same structural requirements of the thicker load bars 64 shown in FIG. 2. As shown in FIGS. 12 and 13, tie rods 518 may be bolted to load members 514 at service end 504 and then pass through end plate 508 into load members 514 at the other end of the stack 502, and be bolted through compression springs 522. In other embodiments, tie rods 518 may also pass through end plate 520. The compression springs 522 may be located on either side of the stack 502. Other arrangements are possible, including combinations of the above features.

Other embodiments are within the scope of the following claims. For example, the leaf springs and other springs that are described herein may be made from various heat treated steels. The end plate 56 may be compression molded or injection molded. The pipe 70 may be made of stainless steel or made of a plastic material. The pipes may have a single bolted flange, a twist lock flange or a wire formed quick connection. The tie rods 60 may be made from heat treated steel or may be replaced with bolts, rods, bands, cables, or other structural tension members. The load bar 64 may be made of aluminum or cast ductile iron and may be replaced by stamped steel or aluminum. The current collector plate 120 at the service end 81 of the assembly 50 may be machined out of copper and may also be stamped, as examples. The manifold 100 may be machined, compression molded, or injection molded. In an alternative design, the ports 70 may extend through the openings 99 in the end plate 54 and may be barbed to allow for hose connections. The end plate 54 may be made from, as examples, a stamped steel or aluminum plate. The collector plate 54 may be made from a stainless steel or a nickel plated carbon steel, as examples. The stack assembly 50 may be oriented in either a vertical or a horizontal orientation, as examples.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A fuel cell stack assembly comprising:

a fuel cell stack including fluid passageways;

pipes to communicate fluids with the fluid passageways;

an end plate to support a compressive load to compress the stack, the end plate including openings; and a dielectric manifold located between the end plate and the stack to communicate the fluids between the pipes and the fluid passageways, the manifold at least partially extending through the openings in the end plate to form a sealed connection between the manifold and the pipes.

2. The assembly of claim 1, wherein the dielectric manifold includes a relatively flat portion and annular inserts that at least partially extend into the openings of the end plate from the relatively flat portion.

3. The assembly of claim 1, wherein the end plate further comprises at least one edge turned away from a plane of the end plate to provide structural support.

4. The assembly of claim 3, wherein the end plate has at least two sets of opposing edges turned away from a plane of the end plate.

5. The assembly of claim 2, wherein the relatively flat portion mates with a flat surface of the end plate.

6. The assembly of claim 1, wherein the end plate is electrically conductive.

7. The assembly of claim 1, wherein at least one of the pipes includes a flange to mate with a surface of the end plate and a tubular extension that at least partially extends through one of the openings.

8. The assembly of claim 1, further comprising:

a collector plate located between the manifold and the stack.

9. The assembly of claim 1, further comprising:

an end plate coolant air bleed port.

10. The assembly of 8, wherein the manifold includes a recessed portion that receives the collector plate.

11. The assembly of claim 10, wherein the manifold includes a substantially flat portion that mates with the stack.

12. The assembly of 8, further comprising:

a connector; and a conductive rod that extends through additional openings in the manifold and end plate to establish an electrical connection between the current collector and the connector.

13. The assembly of claim 1, further comprising:

a load bar positioned to exert a force on the end plate; and tie rods connected to the load bar to cause the load bar to exert the force.

14. The assembly of claim 13, wherein the load bar is a channel member having support lips to provide structural support.

15. The assembly of claim 1, wherein the pipes are adapted to plug directly into the manifold.

16. The assembly of claim 13, further comprising:

the end plate having a length, a width and a thickness; and two parallel load bars extending in a length direction, the load bars being spaced apart at a distance being one-half of the width of the end plate.

17. The assembly of claim 1, further comprising:

at least one O-ring seal to at least partially form the sealed connection.

* * * * *